United States Patent
Bulova et al.

(10) Patent No.: US 11,795,377 B2
(45) Date of Patent: Oct. 24, 2023

(54) PRE-PROCESSED FIBER FLOCKS AND METHODS OF USE THEREOF

(71) Applicant: SCHLUMBERGER TECHNOLOGY CORPORATION, Sugar Land, TX (US)

(72) Inventors: Marina Nikolaevna Bulova, Moscow (RU); John Daniels, Woodinville, WA (US); Dmitriy Ivanovich Potapenko, Sugar Land, TX (US); Bruno Lecerf, Houston, TX (US); Alexey Alexandrovich Sova, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 333 days.

(21) Appl. No.: 16/063,754

(22) PCT Filed: Dec. 21, 2015

(86) PCT No.: PCT/RU2015/000902
§ 371 (c)(1),
(2) Date: Jun. 19, 2018

(87) PCT Pub. No.: WO2017/111640
PCT Pub. Date: Jun. 29, 2017

(65) Prior Publication Data
US 2020/0270513 A1    Aug. 27, 2020

(51) Int. Cl.
*C09K 8/70* (2006.01)
*E21B 43/26* (2006.01)
*C09K 8/68* (2006.01)

(52) U.S. Cl.
CPC .............. *C09K 8/70* (2013.01); *C09K 8/68* (2013.01); *C09K 2208/08* (2013.01); *E21B 43/26* (2013.01)

(58) Field of Classification Search
CPC ........ E21B 43/267; E21B 43/26; E21B 33/13; C09K 8/70; C09K 8/80; C09K 8/805;
(Continued)

(56) References Cited

U.S. PATENT DOCUMENTS 2,846,390 A * 8/1958 Lummus ................ C09K 8/516
507/119
3,593,798 A * 7/1971 Darley ................. C09K 8/5045
166/276
(Continued)

FOREIGN PATENT DOCUMENTS

EP    3048240 A1 * 7/2016 ............. C08G 63/08
GB    2197364 A    5/1988
(Continued)

OTHER PUBLICATIONS

Preserve & Pickle, Dehydrator vs. Oven Drying, retrieved Oct. 6, 2022 from https://preserveandpickle.com/dehydrator-vs-oven-drying/ (Year: 2022).*
(Continued)

*Primary Examiner* — Angela M DiTrani Leff
(74) *Attorney, Agent, or Firm* — Jeffrey D. Frantz (57) ABSTRACT

A slurry for treating a wellbore, comprising a base fluid and a plurality of pre-processed fiber flocks dispersed in the base fluid.

13 Claims, 8 Drawing Sheets

(58) Field of Classification Search
CPC ...... C09K 2208/08; C09K 8/50; C09K 8/516;
C09K 8/03; C09K 8/87032; C09K 8/035;
C09K 8/42; C09K 8/68; C09K 8/62;
C09K 2208/18; C09K 8/82
See application file for complete search history.

(56) References Cited

U.S. PATENT DOCUMENTS

| | | | |
|---|---|---|---|
| 4,102,401 | A | 7/1978 | Erbstoesser |
| 4,139,060 | A | 2/1979 | Muecke et al. |
| 4,424,247 | A * | 1/1984 | Erickson .............. B32B 27/065 428/138 |
| 4,526,240 | A * | 7/1985 | McKinley ................ C09K 8/92 166/292 |
| 4,716,964 | A | 1/1988 | Erbstoesser et al. |
| 4,951,751 | A | 8/1990 | Jennings, Jr. |
| 5,295,393 | A | 3/1994 | Thiercelin |
| 5,582,249 | A * | 12/1996 | Caveny ................ E21B 43/025 166/276 |
| 6,006,838 | A | 12/1999 | Whiteley et al. |
| 6,310,008 | B1 * | 10/2001 | Rietjens ................ C09K 8/685 507/903 |
| 6,399,546 | B1 | 6/2002 | Chang et al. |
| 6,543,538 | B2 | 4/2003 | Tolman et al. |
| 6,667,280 | B2 | 12/2003 | Chang et al. |
| 6,903,054 | B2 | 6/2005 | Fu et al. |
| 6,907,936 | B2 | 6/2005 | Fehr et al. |
| 7,036,587 | B2 | 5/2006 | Munoz, Jr. et al. |
| 7,042,272 | B2 | 5/2006 | Dornbusch |
| 7,051,812 | B2 | 5/2006 | McKee et al. |
| 7,267,170 | B2 | 9/2007 | Mang et al. |
| 7,380,600 | B2 | 6/2008 | Willberg et al. |
| 7,380,602 | B2 | 6/2008 | Brady et al. |
| 7,506,689 | B2 | 3/2009 | Surjaatmadja et al. |
| 7,565,929 | B2 * | 7/2009 | Bustos .................... C09K 8/74 166/279 |
| 8,490,698 | B2 * | 7/2013 | Panga .................... E21B 43/04 166/308.4 |
| 8,778,851 | B2 * | 7/2014 | Daccord ................ C09K 8/035 507/119 |
| 9,663,706 | B2 | 5/2017 | Fu et al. |
| 2005/0011648 | A1 * | 1/2005 | Nguyen ................ E21B 43/025 166/276 |
| 2006/0175059 | A1 | 8/2006 | Sinclair et al. |
| 2006/0185848 | A1 | 8/2006 | Surjaatmadja et al. |
| 2007/0169935 | A1 | 7/2007 | Akbar et al. |
| 2008/0006413 | A1 * | 1/2008 | Le Gloahec .......... E21B 43/108 166/369 |
| 2008/0156498 | A1 | 7/2008 | Phi et al. |
| 2010/0212906 | A1 | 8/2010 | Fulton et al. |
| 2010/0267591 | A1 | 10/2010 | Todd et al. |
| 2010/0288500 | A1 * | 11/2010 | Carlson ................ C09K 8/035 166/308.1 |
| 2011/0005758 | A1 * | 1/2011 | Shindgikar .............. C09K 8/32 166/305.1 |
| 2011/0127727 | A1 * | 6/2011 | Hallundb .............. E21B 43/267 277/316 |
| 2011/0297375 | A1 * | 12/2011 | Shindgikar ............ C09K 8/516 166/276 |
| 2011/0315402 | A1 * | 12/2011 | Popov .................... E21B 33/138 166/386 |
| 2012/0108472 | A1 * | 5/2012 | Wu ........................ C09K 8/035 507/112 |
| 2013/0035265 | A1 * | 2/2013 | Daccord ................ C09K 8/70 507/230 |
| 2013/0199782 | A1 * | 8/2013 | Vidma .................. E21B 43/267 166/305.1 |
| 2013/0228336 | A1 * | 9/2013 | Droger .................. C09K 8/508 166/305.1 |
| 2013/0284518 | A1 * | 10/2013 | Wu ........................ C09K 8/035 175/65 |
| 2013/0324443 | A1 * | 12/2013 | Wang .................. C04B 24/2688 166/305.1 |
| 2014/0141676 | A1 * | 5/2014 | Crandall ............ D04H 1/43828 264/103 |
| 2015/0159076 | A1 * | 6/2015 | Arias Prada ............. C09K 8/42 166/305.1 |
| 2015/0159477 | A1 | 6/2015 | Lecerf et al. |
| 2015/0252660 | A1 * | 9/2015 | Usova ...................... C09K 8/03 166/302 |
| 2015/0344772 | A1 * | 12/2015 | Droger ..................... C09K 8/80 166/280.1 |

FOREIGN PATENT DOCUMENTS

| | | | |
|---|---|---|---|
| WO | 2011081546 A1 | 7/2011 | |
| WO | WO-2014074326 A1 * | 5/2014 | .............. C09K 8/03 |
| WO | 2015088827 A1 | 6/2015 | |
| WO | WO-2016118167 A1 * | 7/2016 | ............. C04B 28/02 |

OTHER PUBLICATIONS

Badri, M. et al., "Key to the Success Application of Hydraulic Fracturing in an Emerging Coalbed Methane Prospect—An Example from the Peat Coals of Australia", SPE-64493, SPE Asia Pacific Oil and Gas Conference and Exhibition, Oct. 16-18, 2000, 15 pages.
Bartko et al., "Field and laboratory experience in closed fracture acidizing the Lisburne field, Prudhoe Bay, Alaska", SPE 24855, 67th Annual Technical Conference and Exhibition on the Society of Petroleum Engineers, Oct. 4-7, 1992, pp. 923-931.
Bell et al., "Effective diverting on horizontal wells in the Austin Chalk", SPE 26582, 68th Annual Technical Conference and Exhibition of the Society of Petroleum Engineers, Oct. 3-6, 1993, pp. 725-738.
Bellarby, J.E. et al., "Design and implementation of a high rate acid stimulation through a subsea intelligent completion", SPE 83950, Offshore Europe 2003, Sep. 2-5, 2003, 10 pages.
Blinten et al., "Stimulating very long gross intervals", SPE 13709, SPE 1985 Middle East Oil Technical Conference and Exhibition, Mar. 11-14, 1985, pp. 227-238.
Brown, R.W. et al., "Factors influencing optimum ball sealer performance", Journal of Petroleum Technology, vol. Apr. 1963, pp. 450-454.
Cramer, D.D., "Stimulating Unconventional Reservoirs: Lessons Learned, Successful Practices, Areas for Improvement", SPE-114172, 2008 SPE Unconventional Reservoirs Conference, Feb. 10-12, 2008, 19 pages.
Doerler et al., "Diverting agents: laboratory study and modeling of resultant zone injectivities", SPE 16250, SPE International Symposium on Oilfield Chemistry, Feb. 4-6, 1987, pp. 45-56.
East et al., "Hydrajet Perforating and Proppant Plug Diversion in Multi-Interval Horizontal Well Fracture Stimulation: Case Histories", SPE-114881, 2008 SPE Tight Gas Completions Conference, Jun. 9-11, 2008, 17 pages.
Eberhard et al., "Application of flow-thru composite frac plugs in tight-gas sand completions", SPE 84328, SPE Annual Technical Conference and Exhibtion, Oct. 5-8, 2003, 10 pages.
Emanuele, M.A. et al., "A Case Study: Completion and Stimulation of Horizontal Wells with Multiple Transverse Hydraulic Fractures in the Lost Hills Diatomite", SPE 46193, 1998 SPE Western Regional Meeting, May 10-13, 1998, 13 pages.
Erbstoesser, S.R., "Improved ball sealer diversion", Journal of Petroleum Technology, 1980, vol. November, pp. 1903-1910.
Gabriel, G.A. et al., "The design of buoyant ball sealer treatments", SPE 13085, 59th Annual Technical Conference and Exhibition, Sep. 16-19, 1984, 12 pages.
Gall, J.W., "Steam diversion by surfactants", SPE 14390, 60th Annual Technical Conference and Exhibition of the Society of Petroleum Engineers, Sep. 22-25, 1985, 9 pages.
Gallus et al., "Deformable diverting agent for improved well stimulation" Journal of Petroleum Technology. Apr. 1969, SPE 2161, pp. 497-504.
Gallus et al., "Fluid diversion to improve well stimulation", SPE 3811, 1972, 16 pages.

(56) References Cited

OTHER PUBLICATIONS

Glasbergen, et al., "Design and Field Testing of a Truly Novel Diverting Agent", SPE 102606, 2006 SPE Annual Technical Conference and Exhibition, Sep. 24-27, 2006, 20 pages.
Hannah, R.R., "New fracturing technique leads to improved performance in the Mississippian trend", Journal of Petroleum Technology, 1976, vol. August, SPE 5628, pp. 859-864.
Harrison, N.W., "Diverting Agents—History and Application", Journal of Petroleum Technology, May 1972, pp. 593-598.
Hewett et al., "Induced Stress Diversion: A Novel Approach to Fracturing Multiple Pay Sads of the NBU Field, Uintah Co., Utah", SPE-39945, 1998 SPE Rocky Mountain Regional/Low-Permeability Reservoirs Symposium and Exhibition, Apr. 5-8, 1998, pp. 375-383.
Hill et al., "Laboratory and theoretical modeling of diverting agent behavior", Journal of Petrolium Technology, 1984, vol. July, pp. 1157-1163.
Hu et al., "Evaluation of a-olefin sulfonates for steam diversion", SPE/DOE 12660, SPE/DOE Fourth Symposium on Enhanced Oil Recovery, Apr. 15-18, 1984, pp. 301-314.
Johnson et al., "Large-Volume, High-Rate Stimulation Treatments in Horizontal Wells in the Niobara Formation, Silo Field, Laramie Country, Wyoming", SPE 25926, SPE Rocky Mountain Regional/Low Permeability Reservoirs Symposium, Apr. 12-14, 1993, pp. 781-794.
Li et al., "Multi-stage fracturing stimulations improve well performance in tight oil reservoirs of the Changqing Oilfiels", IPTC 12303, International Petroleum Technology Conference, Dec. 3-5, 2008, 8 pages.
Lonnes et al., "Advanced multizone stimulation technology", SPE 95778, 2005 SPE Annual Technical Conference and Exhibition, Oct. 9-12, 2005, 7 pages.
McDaniel et al., "Stimulation Techniques for Low Permeability Reservoirs with Horizontal Completions that Do Not Have Cemented Casing", SPE-75688, SPE Gas Technology Symposium, Apr. 30-May 2, 2002, 14 pages.
Morgenthaler et al., "Model wellbore evaluation of diverter effectiveness confirmed by field results", SPE 31140, SPE International Symposium on Formation Damage Control, Feb. 14-15, 1996, pp. 667-674.
Nasr-El-Din, H.A. et al., "Laboratory evaluation of biosealers", SPE 65017, 2001 SPE International Symposium on Oilfield Chemistry, Feb. 13-16, 2001, 11 pages.
Nitters et al., "Granular diverting agents selection, design and performance", SPE 18884, SPE Production Operations Symposium, Mar. 13-14, 1989, pp. 531-538.
Paccaloni, G., "A new, effective matrix stimulation diversion technique", SPE Production&Facilities. 1995, vol. August, pp. 151-156.
Pongratz et al., "Optimizing matrix acid treatments in multilayered reservoir in Russia by applying different diversion techniques", SPE 94485, SPE European Formation Damage Conference, May 25-27, 2005, 15 pages.
Potapenko et al., "Barnett Shale Refracture Stimulations Using a Novel Diversion Technique", SPE 119636, 2009 SPE Hydraulic Fracturing Technology Conference, Jan. 19-21, 2009, 11 pages.
Pritchett et al., "Completion of the KCC 378-H: A case study", SPE 23948, 1992 SPE Permian Basin Oil and Gas Recovery Conference, pp. 189-202.
Rees et al., "Successful Hydrajet Acid Squeeze and Multifracture Acid Treatments in Horizontal Open Hole Using Dynamic Diversion Process and Downhole Mixing", SPE-71692, 2001 SPE Annual Technology Conference, Sep. 30, 2001, 13 pages.
Smith et al., "New diverting techniques for acidizing and fracturing", SPE 2751, Society of Petroleum Engineers of AIME, 1969, 8 pages.
Stipp et al., "Pseudolimited entry: A sand fracturing technique for simultaneous treatment of multiple pays", SPE 1903, Society of Petroleum Engineers, 1968, 6 pages.
Strassner et al., "Laboratory/field study of oil-soluble resin-diverting agents in Prudhow Bay, Alaska, Acidizing Operations", SPE 20622, 65th Annual Technical Conference and Exhibition of the Society of Petroleum Engineers, Sep. 23-26, 1990, pp. 77-86.
Surjaatmadja et al., "Successful Acid Treatments in Horizontal Openholes Using Dynamic Diversion and Downhole Mixing—An in Depth Postjob Evaluation", SPE-75221, SPE/DOE Improved Oil Recovery Symposium, Apr. 13-17, 2002.
Surjaatmadja et al., "Successfull Acid Treatments in Horizontal Openholes Using Dynamic Diversion and Instant Response Downhole Mixing—An In-Depth Postjob Evaluation", SPE-75522, SPE Gas Technology Symposium, Apr. 30-May 2, 2002, 11 pages.
Zimmerman, J.C. et al., "Selection of tools for stimulation in horizontal cased hole", SPE 18995, SPE Joint Rocky Mountain Regional/Low Permeability Reservoirs Symposium and Exhibition, Mar. 6-8, 1989, pp. 629-640.
International Search Report and Written Opinion issued in International Patent Appl. No. PCT/RU2015/000902 dated Oct. 6, 2016; 6 pages.

* cited by examiner

PRE-PROCESSED FIBER FLOCKS AND METHODS OF USE THEREOF

BACKGROUND

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (such as acid) stimulation, or a combination of the two (called acid fracturing).

In hydraulic and acid fracturing, a first, viscous fluid called the pad is typically injected into the formation to initiate and propagate the fracture. This is followed by a second fluid that contains a proppant to keep the fracture open after the pumping pressure is released. Granular proppant materials may include sand, ceramic beads, or other materials. These types of materials are well known to those skilled in the art. In "acid" fracturing, the fluid contains an acid that can dissolve part of the rock, causing irregular etching of the fracture face and removal of some of the mineral matter, resulting in the fracture not completely closing when the pumping is stopped. Occasionally, hydraulic fracturing can be done with a low viscous fluid (i.e., slick water) to minimize the damage caused by polymers or the cost of viscosifiers.

Hydraulic and acid fracturing of horizontal wells as well as multi-layered formations frequently uses diverting techniques in order to enable fracturing redirection between different zones. The list of these diverting methods includes, but is not limited to, using mechanical isolation devices such as packers and wellbore plugs, setting bridge plugs, pumping ball sealers, pumping slurred benzoic acid flakes and removable/degradable particulates.

Treatment diversion with particulates is typically based on bridging of particles of the diverting material behind casing and forming a plug by accumulating the rest of the particles at the formed bridge. Several common problems related to treatment diversion with particulate materials are: reducing the bridging ability of the diverting slurry during pumping because of dilution with wellbore fluid (interface mixing), the necessity of using a relatively large amount of diverting materials, and a poor stability of some diverting agents during pumping, as well as during subsequent treatment stages.

On the other way, during drilling of a wellbore, various fluids are typically used in the wellbore for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure, to prevent the ingress of formation fluids into the wellbore, to cool and lubricate the drill string and bit, and/or to maximize the penetration rate.

Lost circulation is a recurring drilling problem, characterized by loss of drilling mud into downhole formations. It can occur naturally in formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production.

Lost circulation is frequently controlled by including an additive in fluids injected into the wellbore. The most common additive used to control or cease lost circulation is bentonite which will seal small holes or fractures. Bentonite, in higher concentrations, increases viscosity and slows the fluid flow into the surrounding rock. Other solids, such as ground paper, ground corn cobs and sawdust, have also been used to control fluid loss. Polymers are also sometimes used to increase the viscosity of a wellbore fluid and to control fluid loss. Polymer additives, however, are generally more expensive than particulates such as bentonite.

Drilling, cementing and treatments of oil and gas wells, as well as workover operations frequently involve isolating wellbore zones. Methods of zonal isolation are well known to those skilled in the art and include pumping particulate materials (such as grains, fiber, flakes, proppant), viscosified fluids or foams, or may involve various mechanical tools.

Performing well operations also frequently implies delivery of various chemical additives downhole minimizing their interactions with wellbore fluid or casing. Existing methods of downhole delivery include a wide range of techniques such as bullheading, using bailers, mechanical containers, using encapsulated agents, or pumping through coil-tubing. However, the existing methods of downhole delivery have certain limitations and their use is restricted by the range of applicability.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a slurry for treating a wellbore that includes a base fluid and a plurality of pre-processed fiber flocks dispersed in the base fluid.

In another aspect, embodiments of the present disclosure relate to a method of treating a subterranean formation penetrated by a wellbore, that includes injecting a slurry into the wellbore, the slurry including a base fluid and a plurality of pre-processed fiber flocks dispersed in the base fluid, allowing the pre-processed fiber flocks to form a removable plug and performing a downhole operation.

Other aspects and advantages of the claimed subject matter will be apparent from the following description and the appended claims.

BRIEF DESCRIPTION OF DRAWINGS

Embodiments of the present disclosure are described with reference to the following figures. The same numbers are used throughout the figures to reference like features and components.

DETAILED DESCRIPTION

Generally, embodiments disclosed herein relate to pre-processed fiber flocks and methods of using the same. More specifically, embodiments disclosed herein relate to slurries for treating a wellbore formed of a base fluid and a plurality of pre-processed fiber flocks dispersed in the base fluid. The inventors of the present disclosure have found that pre-processed fiber flocks present in wellbore fluids may be used as potential zonal isolation agents, fluid diverting agents, or as agents ("containers") for downhole delivery of various chemical additives.

Figure 1:
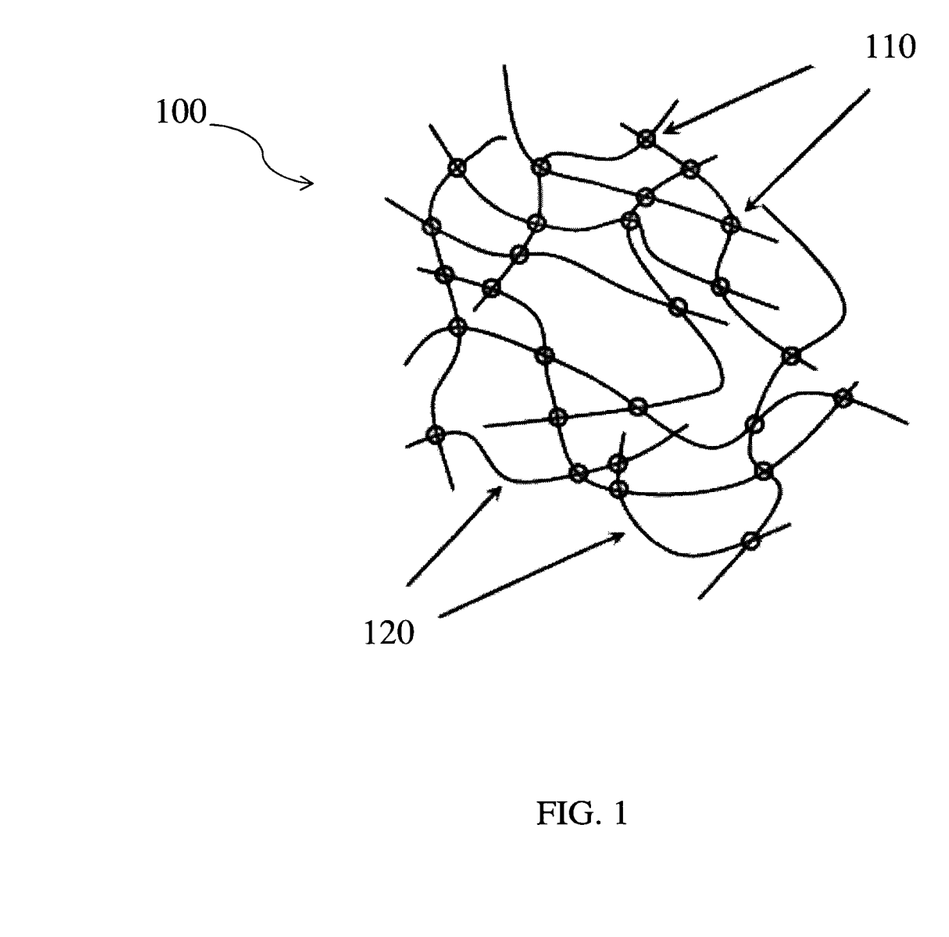
FIGS. 1 and 2 depict a schematic representation of pre-processed fiber flocks according to embodiments of the present disclosure.

The slurries of the present disclosure may incorporate a plurality of pre-processed fiber flocks that can be dispersed or suspended in a base fluid with the formation of a slurry. As defined herein, pre-processed fiber flocks are 3D fiber networks made by gluing a number of fiber particles 120 together at the points of fiber contact 110, with the formation of a mechanically stable 3D fiber network 100 as shown in FIG. 1. As the formed 3D fiber networks have a size much larger than the size of the individual fibers, the 3D fiber networks may be able to bridge in much wider fractures than individual fibers and/or bridge a fracture with reduced volumes of materials. Such approach may provide control over the size of the formed aggregates, and therefore, a better control over bridging and effectiveness of zonal isolation, as it will be described in more detail later. According to various embodiments, the gluing process may be accomplished by gluing fibers together by means of applying a coating on the fibers. In one or more embodiments, an adhesive material may be used to glue together fibers with the formation of the pre-processed fiber flocks. It is also envisioned that the pre-processed fiber flocks may be prepared by heating, when fibers may melt together with the formation of a 3D fiber network.

Upon injecting a slurry including pre-processed fiber flocks dispersed in a base fluid into the wellbore, a plug may form. Creating plugs may happen by accumulating pre-processed fiber flocks in a void space (such as tunnels, hydraulic fractures, vugs, or wormholes) behind casing, with the formation of a bridge. According to the present embodiments, the plugs formed by the pre-processed fiber flocks may have low permeability due to the high ability to bridge/jam in small slots and narrow voids of the flocks. As the fibers are preformed in flocks, the formation of a network or a plug may occur without activation of the fibers.

According to the present embodiments, the fibers used to prepare the fiber flocks may be removable or may include removable components. As defined herein, the term removable means degradable, chemically removable, meltable or soluble in a surrounding fluid. In various embodiments, the pre-processed fiber flocks may be formed using degradable materials. As defined herein, degradable materials may include those materials that can be softened, dissolved, reacted or otherwise made to degrade within the wellbore fluids. Such materials may be soluble in aqueous fluids or in hydrocarbon fluids. In various embodiments, degradable materials may include polyvinyl alcohol, polyethylene terephthalate (PET), polyethylene, dissolvable salts, polysaccharides, waxes, benzoic acid, naphthalene based materials, magnesium oxide, sodium bicarbonate, calcium carbonate, sodium chloride, calcium chloride, ammonium sulfate, soluble resins, water soluble glass and the like, and combinations of these.

Non-limiting examples of degradable materials that may be used include certain polymer materials that are capable of generating acids upon degradation. These polymer materials may herein be referred to as "polymeric acid precursors". These materials are typically solids at room temperature. The polymeric acid precursor materials may include the polymers and oligomers that hydrolyze or degrade in certain chemical environments under known and controllable conditions of temperature, time, and pH to release organic acid molecules that may be referred to as "monomeric organic acids." As used herein, the expression "monomeric organic acid" or "monomeric acid" may also include dimeric acid or acid with a small number of linked monomer units that function similarly to monomer acids composed of one monomer unit, in that they are fully in solution at room temperature.

Polymer materials may include those polyesters obtained by polymerization of hydroxycarboxylic acids, such as the aliphatic polyesters of lactic acid, referred to as polylactic acid; of glycolic acid, referred to as polyglycolic acid; of 3-hydroxybutyric acid, referred to as polyhydroxybutyrate; of 2-hydroxyvaleric acid, referred to as polyhydroxyvalerate; of epsilon caprolactone, referred to as polyepsilon caprolactone or polycaprolactone; the polyesters obtained by esterification of hydroxyl amino acids such as serine, threonine and tyrosine; and the copolymers obtained by mixtures of the monomers listed above. A general structure for the above described homopolyesters is: $H-\{O-[C(R_1, R_2)]_x-[C(R_3,R_4)]_y-C=O\}_z-OH$, where $R_1$, $R_2$, $R_3$, and $R_4$ are either H, linear alkyl, such as $CH_3$, $CH_2CH_3$ $(CH_2)_n CH_3$, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others); x is an integer between 1 and 11; y is an integer between 0 and 10; and z is an integer between 2 and 50,000.

Under appropriate conditions (pH, temperature, water content) polyesters such as those described here may hydrolyze and degrade to yield hydroxycarboxylic acids and compounds such as those acids referred to in the foregoing as "monomeric acids."

One example of a suitable degradable polymeric acid precursor, as mentioned above, is the polymer of lactic acid, sometimes called polylactic acid, "PLA," polylactate or polylactide. Lactic acid is a chiral molecule which has two optical isomers, D-lactic acid and L-lactic acid, respectively. The poly(L-lactic acid) and poly(D-lactic acid) forms are generally crystalline in nature. Polymerization of a mixture of the L- and D-lactic acids to poly (DL-lactic acid) results in a polymer that is more amorphous in nature. The polymers described herein are substantially linear. The degree of polymerization of the linear polylactic acid may vary from as few units as needed to make them solids under downhole conditions (such as 2-10 units) (oligomers) to several thousand monomeric units (e.g., 2000-5000). It is also envisioned that cyclic structures of PLA may be used. In such embodiments, the degree of polymerization of the cyclic structures may be smaller than that of the linear polymers. In one or more embodiments, the cyclic structures may include cyclic dimers if they are solids under storage and wellsite ambient conditions. As noted above, particles of PLA may be used in various embodiments.

Another example is the polymer of glycolic acid (hydroxyacetic acid), also known as polyglycolic acid ("PGA"), or polyglycolide. Other materials suitable as polymeric acid precursors are those polymers of glycolic acid with itself or with other hydroxy-acid-containing moieties.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

Other examples of polyesters of hydroxycarboxylic acids that may be used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

Polyesters obtained by esterification of other hydroxyl-containing acid-containing monomers such as hydroxyamino acids may be used as polymeric acid precursors. Naturally occurring amino acids are L-amino acids. The three most common amino acids that contain hydroxyl groups are L-serine, L-threonine, and L-tyrosine. These amino acids may be polymerized to yield polyesters at the appropriate temperature and using appropriate catalysts by reaction of their alcohol and their carboxylic acid groups. D-amino acids are less common in nature, but their polymers and copolymers may also be used as polymeric acid precursors. NatureWorks, LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. The PLAs currently available from NatureWorks, LLC have number average molecular weights ($M_n$) of up to about 100,000 and weight averaged molecular weights ($M_W$) of up to about 200,000, although any polylactide (made by any process by any manufacturer) may be used. Those available from NatureWorks, LLC typically have crystalline melt temperatures of from about 120 to about 170° C., but others are obtainable. Poly (D,L-lactide) of various molecular weights is also commercially available from Bio-lnvigor, Beijing and Taiwan. Bio-lnvigor also supplies polyglycolic acid (also known as polyglycolide) and various copolymers of lactic acid and glycolic acid, often called "polygalactin" or poly (lactide-co-glycolide).

The extent of the crystallinity can be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form. Some of the polymers dissolve very slowly in water before they hydrolyze.

Amorphous polymers may be useful in certain applications. An example of a commercially available amorphous polymer is that available as NATUREWORKS 4060D PLA, available from NatureWorks, LLC, which is a poly (DL lactic acid) and contains approximately 12% by weight of D-lactic acid and has a number average molecular weight ($M_n$) of approximately 98,000 g/mol and a weight average molecular weight ($M_W$) of approximately 186,000 g/mol.

Other polymer materials that may be useful are the polyesters obtained by polymerization of polycarboxylic acid derivatives, such as dicarboxylic acid derivatives with polyhydroxy-containing compounds, in particular dihydroxy containing compounds. Polycarboxylic acid derivatives that may be used are those of dicarboxylic acids such as oxalic acid, propanedioic acid, malonic acid, fumaric acid, maleic acid, succinic acid, glutaric acid, pentanedioic acid, adipic acid, phthalic acid, isophthalic acid, terephthalic acid, aspartic acid, or glutamic acid; polycarboxylic acid derivatives are those such as of citric acid, poly and oligo acrylic acid and methacrylic acid copolymers; other materials that may be used if they are solids, or may be used as starting materials for polymerization if they are liquids, are dicarboxylic acid anhydrides, such as, maleic anhydride, succinic anhydride, pentanedioic acid anhydride, adipic acid anhydride, phthalic acid anhydride; dicarboxylic acid halides, primarily dicarboxylic acid chlorides, such as propanedioic acyl chloride, malonyl chloride, fumaroyl chloride, maleyl chloride, succinyl chloride, glutaroyl chloride, adipoyl chloride, and phthaloyl chloride. Useful polyhydroxy containing compounds for making useful degradable polymers are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); and polyols such as glycerol. When both a dicarboxylic acid derivative and a dihydroxy compound are used, a linear polyester results. It is understood that when one type of dicarboxylic acid is used, and one type of dihydroxy compound is used, a linear homopolyester is obtained. When multiple types of polycarboxylic acids and/or polyhydroxy containing monomers are used, copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, determine the configuration of the polymer (linear, branched, star, slightly crosslinked or fully crosslinked). These configurations can be hydrolyzed or "degraded" to carboxylic acid monomers, and therefore can be considered as polymeric acid precursors. As one non-limiting example, that provides an indication of the general structure of the most simple cases encountered, the general structure for the linear homopolyesters useful is: $H-\{O-R_1-O-C=O-R_2-C=O\}_z-OH$, where $R_1$ and $R_2$ are linear alkyl, branched alkyl, aryl, and alkylaryl groups; and z is an integer between 2 and 50,000.

Other examples of suitable polymeric acid precursors are the polyesters derived from phthalic acid derivatives such as polyethylene terephthalate (PET), polybutylene terephthalate (PBT), polyethylene naphthalate (PEN), and the like.

Under the appropriate conditions (for example pH, temperature, and water content) polyesters such as those described herein can "hydrolyze" and "degrade" to yield polycarboxylic acids and polyhydroxy compounds, regardless of the original polyester synthesized from any of the polycarboxylic acid derivatives listed above. The polycarboxylic acid compounds yielded by the polymer degradation process are also considered monomeric acids.

Other examples of polymer materials that may be used are those obtained by the polymerization of sulfonic acid derivatives with polyhydroxy compounds, such as polysulphones or phosphoric acid derivatives with polyhydroxy compounds, such as polyphosphates.

Such solid polymeric acid precursor material may be capable of undergoing an irreversible breakdown into fundamental acid products downhole. As referred to herein, the term "irreversible" will be understood to mean that the solid polymeric acid precursor material, once broken downhole, does not reconstitute downhole, e.g., the material breaks down in situ but does not reconstitute in situ. The term "breakdown" refers to both of the two extreme cases of hydrolytic degradation that the solid polymeric acid precursor material may undergo, e.g., bulk erosion and surface erosion, and any stage of degradation in between these two. This degradation can be a result of, inter alia, a chemical reaction. The rate at which the chemical reaction takes place may depend on, inter alia, the chemicals added, temperature and time. The breakdown of solid polymeric acid precursor materials may or may not depend, at least in part, on their structure. For instance, the presence of hydrolyzable and/or oxidizable linkages in the backbone often yields a material that will breakdown as described herein. The rates at which such polymers breakdown are dependent on factors such as, but not limited to, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer breaks down also may be affected by the environment to which the polymer is exposed, e.g., temperature, presence of moisture, oxygen, microorganisms, enzymes, pH, and the like.

Polyamides and polyimides is another class of suitable solid polymeric materials that may be used for manufacturing pre-processed fiber flocks. Such polymers may comprise hydrolyzable groups in the polymer backbone that may hydrolyze under the conditions that exist downhole. Non-limiting examples of suitable polyamides include proteins, polyamino acids, nylon, and poly(caprolactam). Another class of polymers that may be suitable for use is those polymers that may contain hydrolyzable groups, not in the polymer backbone, but as pendant groups. Hydrolysis of the pendant groups may generate a water soluble polymer and other byproducts. A non-limiting example of such a polymer is polyvinylacetate, which upon hydrolysis forms water-soluble polyvinylalcohol and acetate salts. Other suitable materials include polysaccharides, chitins, chitosans, orthoesters, polyanhydrides, polycarbonates, poly(orthoesters), poly(ethylene oxides), and poly phosphazenes.

It is also envisioned that fibers can be any fibrous material, such as, but not limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like.

As noted above, upon gluing a number of fibers, pre-processed fiber flocks having 3D fiber networks may form. The size and the rigidity of the pre-manufactured fiber flocks may have an impact on the bridging ability of the 3D fiber network. According to various embodiments, the 3D fiber networks may be big enough to pass into a perforation formed in a subterranean formation during a stimulation treatment. As described herein, a perforation hole is any type of hole present in the casing. Such a hole may be a jetted hole, a hole from a slotted liner, a port or any opening in a completion tool, a casing fluid exit point. It is also envisioned that the size of the 3D fiber networks may be slightly larger than a perforation or a void, but, because of being deformable, the 3D fiber networks may pass through it. The pre-processed fiber flocks that have shown utility in the slurries of the present disclosure have 3D fiber networks that are larger in size than an average width of a void within the subterranean formation that is intended to be closer or isolated. Further, it is also intended that the pre-processed flocks may be used in an open hole well (i.e., without casing) during a stimulation treatment or during earlier stages of the well such as drilling or completion operations.

Figure 2:
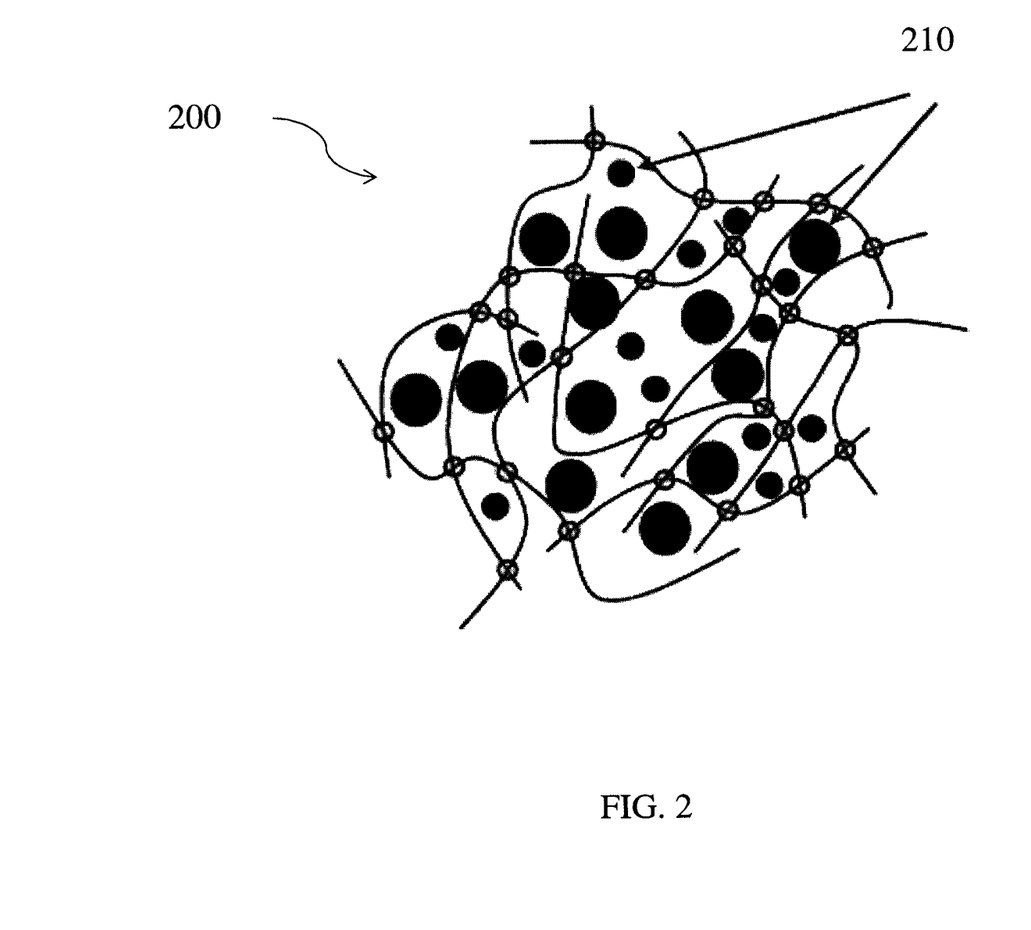

According to various embodiments, the pre-processed fiber flocks may incorporate additives 210, entrapped within the 3D fiber network 200, as shown in FIG. 2. The additives that have shown utility in the present disclosure may be selected from the group of solid or liquid chemical additives. In such embodiments, the chemical additives may be selected from the group of particulate materials or viscosified fluids entrapped within the 3D fiber network. The mechanism of release of such additives may include thermal, mechanical destruction of the 3D fiber network, chemical destruction of the 3D fiber network, chemical degradation or diffusion. As described later, to prevent or reduce the premature release of the entrapped additives, the pre-processed fiber flocks may include removable coatings.

In embodiments where the additives are solids, such solids may increase the rigidity and the bridging properties of the pre-processed fiber flocks. Solids, especially blends of particulates of various sizes, may also assist in decreasing the permeability of the plugs formed by the pre-processed fiber flocks, as it will be described later in Examples 1 and 2. In one or more embodiments, the solid additives may be particulate materials selected from the group of ceramic materials, sand, polymer particles and blends thereof.

As noted above, liquid additives may be entrapped within a fiber network. In one or more embodiments, a viscosified fluid may be entrapped within the fiber network. For example, sodium hydroxide which may act as a degrading agent, but has the disadvantage of being soluble in water, may assist in a controlled degradation of pre-processed fiber flocks if it is incorporated within the 3D fiber network of pre-processed fiber flocks as a viscosified fluid.

In one or more embodiments, the pre-processed fiber flocks may be coated. As used herein, the term coating refers to any chemical or physical modification applied to the surface of the pre-processed fiber flocks with the purpose of preventing an undesirable release of the entrapped additives, such as entrapped particles, during storage or delivery. For example, in various embodiments, the pre-processed fiber flocks may be vacuum packed into a soluble film which may dissolve in water before or after such pre-processed flocks reach perforations. Entrapped solids may also possess swellable properties for lowering permeability of the formed plugs. The coatings that have shown utility in the present disclosure are removable coatings selected from the group of degradable materials, chemically removable materials, materials soluble in a surrounding fluid, or meltable materials at downhole conditions.

Upon mixing, the slurries of the present embodiments may be used for carrying out a variety of subterranean treatments wellbore operations including, but not limited to, drilling operations, diverting treatments, zonal isolation, or downhole delivery. Such operations are known to persons skilled in the art and involve pumping a wellbore fluid into a wellbore through an earthen formation and performing at least one wellbore operation while the wellbore fluid is in the wellbore.

One embodiment of the present disclosure involves a method of treating a subterranean formation penetrated by a wellbore. In one such an illustrative embodiment, the method involves injecting a slurry including a base fluid and a plurality of pre-processed fiber flocks dispersed in the base fluid into the wellbore, allowing the pre-processed fiber flocks to form a removable plug and performing a downhole operation. In one or more embodiments, the downhole operation may comprise stimulating the subterranean formation. In yet another embodiment, the downhole operation may be a drilling operation. In one or more embodiments, the downhole operation may be a cementing operation. It is also envisioned that the pre-processed fiber flocks of the present disclosure may be used for carrying out other subterranean treatments, including, but not limited to, diverting treatments and zonal isolation treatments.

Figure 3:
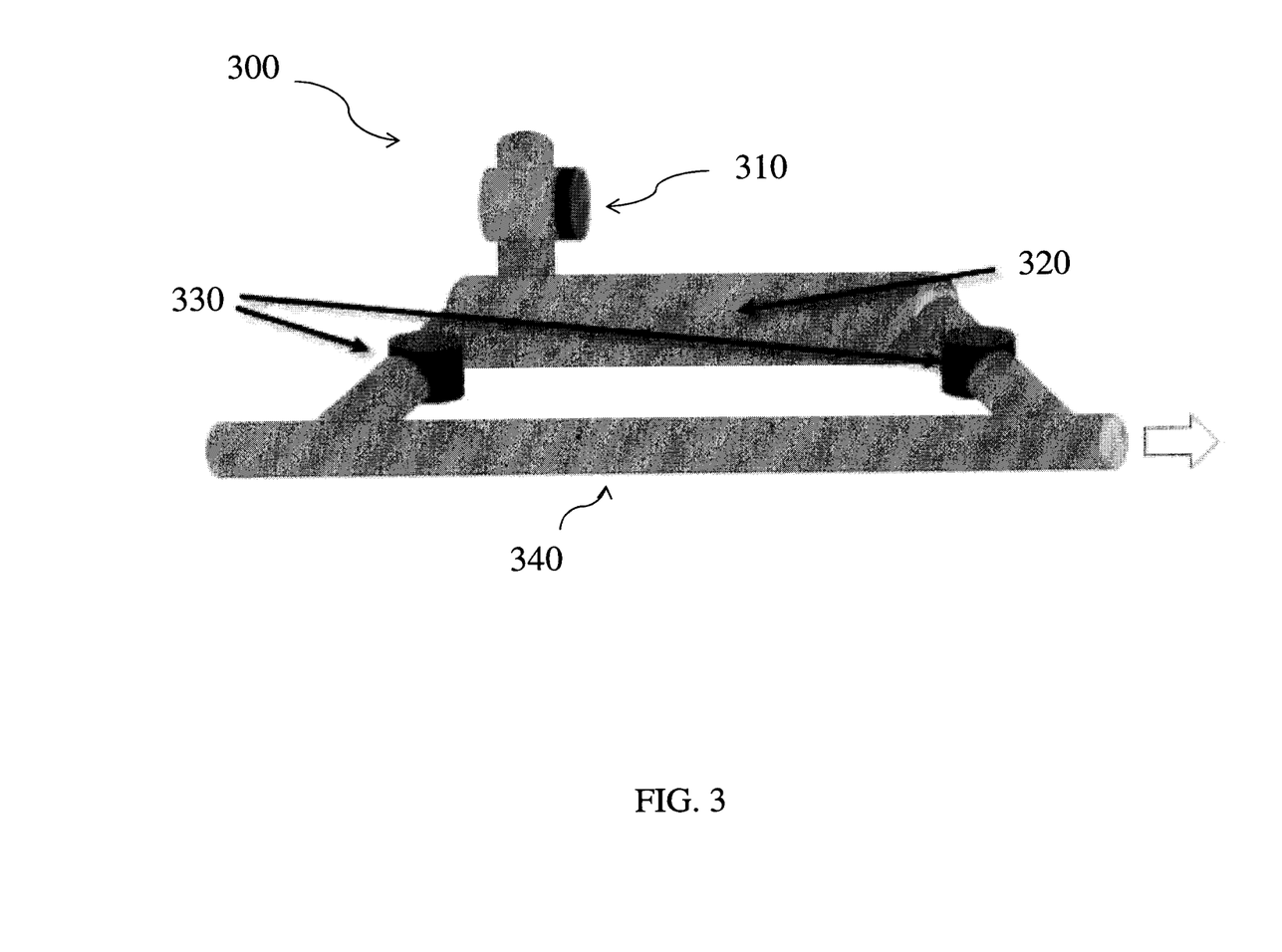
FIG. 3 shows a simplified scheme of an injection set-up for well site delivery of pre-processed fiber flocks according to embodiments of the present disclosure.

The delivery of the pre-processed fiber flocks into a pumping fluid may be performed by using the existing equipment or a flow-through injector as shown in FIG. 3. Referring now to FIG. 3, FIG. 3 shows a flow-through injector 300 having an accumulator 320, a plug valve 310 for filing the accumulator 320, remotely operated valves 330, and a treating line 340. As seen in FIG. 3, the accumulator 320 is filled with the slurry containing the pre-processed fiber flocks. The slurry is introduced in the treating line 340 by means of valves 330.

As noted above, the pre-processed fiber flocks of the present disclosure may be incorporated in slurries used for zonal isolation and/or treatment diversion. Zonal isolation and treatment redirection or diversion are based on treatment redirection because of plugging of the stimulation zone with various solids. According to various embodiments, the slurries of the present disclosure may enable zonal isolation by creating plugs in the proximity of the wellbore. In such embodiments, the additives entrapped within the 3D fiber network may be selected from the group of degradable components. Such components may be fibers or solid agents entrapped within the 3D fiber network. Degradation of such components in the created plug may result in an increase in the conductivity of the sealed zone after completing the well treatment.

As previously discussed, the size and the rigidity of the pre-processed fiber flocks may have an impact on the bridging ability of the fiber flocks. In various embodiments, the pre-processed fiber flocks may have high rigidity and a size that may enable passing perforation holes in casing, as well as jamming of fiber flocks in the formation in voids, in the proximity of the casing. In these embodiments, rigid fiber flocks may be used for diverting slick water treatments in tight gas formations when the diameter of the perforation holes in casing is about 0.33 in (0.84 cm) and the expected width of hydraulic fracture may be less than 0.24 in (0.61 cm) (perforation diameter>size of flocks>fracture width). In such embodiments, the size of the fiber flocks may range from about 0.25 in (0.64 cm) to about 0.35 in (0.89 cm), where the lower limit can be any of 0.25 in (0.64 cm), 0.26 in (0.66 cm), or 0.27 in (0.68 cm) and the upper limit can be any of 0.32 in (0.81 cm), 0.33 in (0.84 cm) or 0.35 in (0.89 cm), where any lower limit can be used with any upper limit. In these embodiments, the size of the fiber flocks is the compressed or minimal possible size of the flock, i.e., fluffy flocks may be compressed, yielding flocks with a smaller size. Pumping the pre-processed fiber flocks may result in jamming the flocks in the perforation tunnels or in the fractures in the proximity of the perforation tunnels and may create a plug in that zone. According to the performed estimation, such approach may involve a very low amount of diverting material as illustrated later in Example 3. Using such a small amount of diverting material may reduce the risk of wellbore plugging during the diversion stage. Using a lower amount of a diverting material in comparison to traditional diverters may also reduce the risk of formation damage and may enable a better post-treatment clean up.

It is also envisioned that the pre-processed fiber flocks may be used as delivery agents of various chemical additives downhole, minimizing their contact with the pumping fluid. In such embodiments, the chemical additives may be included or entrapped within the 3D fiber network of the pre-processed fiber flocks before pumping the slurry downhole. Some examples of such additives may be gelled fluids containing dissolved chemicals or various solid additives. The release of such additives may happen after the slurry containing pre-processed fiber flocks with chemical additives entrapped within their 3D network are pumped downhole. In these embodiments, the 3D structure of the fiber network may prevent mixing of the internal content of the fiber flock with the wellbore fluid during pumping, which may help to deliver such additives downhole in a concentrated form. The chemical additives may be released by different mechanisms. For example, the mechanism that triggers the release of chemical agents may involve a mechanical action, such as squeezing by pressure. It is also envisioned that the release mechanism may involve diffusion, degradation of at least one component of the pre-processed fiber flocks, dissolution of at least one component of the pre-processed fiber flocks, or melting of at least one component of the pre-processed fiber flocks at downhole conditions.

It is also envisioned that the pre-processed fiber flocks used for zonal isolation and/or treatment diversion may include solid additives, such as chemical additives, that accelerate degradation of the 3D fiber network. In one or more embodiments, the chemical additives may be selected from the group of low-soluble bases or salts of weak acids. Such chemical additives may be used for increasing the degradation rate of polyester fiber networks such as made of PLA or PGA. In yet another embodiment, acids may be used for accelerating the degradation of polyamide fiber networks. It is also envisioned that some enzymes may be used as chemical additives for the degradation of cellulose fibers.

As noted above, slurries of the present disclosure may form a plug upon being injected into a wellbore. After treatment, the created plugs are removed. There are several methods that may be applied for removal of such plugs, such as degradation, chemical treatment, melting, or disintegration of the sealer into smaller pieces that will be flushed away. It is also envisioned that plug removal may be achieved through physical dissolution of at least one of the components of the diverting blend in the surrounding fluid. Solubility of the plug may depend on temperature. In this situation post-treatment temperature recovery in the sealed zone may trigger the removal of the plug. A list of possible materials that may possess disintegration include plastics such as PLA, polyamides and composite materials comprising degradable plastics and non-degradable fine solids.

Further, some of the degradable material passes the disintegration stage during the degradation process. For example, PLA may turn into fragile materials before its complete degradation.

According to the present embodiments, the base fluid may be any water based fluid phase. In one or more embodiments, the aqueous base fluid forms the continuous phase of the fluid and may be selected from: fresh water, sea water, brines, mixtures of water or brine and water soluble organic compounds and mixtures thereof. In those embodiments of the disclosure where the aqueous medium is a brine, the brine is water comprising an inorganic salt or organic salt. The salt may serve to provide a portion of the fluid's density (to balance against the formation pressures). In various embodiments of the wellbore fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, nitrates, oxides, sulfates, silicates, phosphates and fluorides. Salts that may be incorporated in a brine include any one or more of those present in natural seawater or any other organic or inorganic dissolved salts. The base fluid may optionally further comprise additional additives, including, but not limited to, acids, fluid loss control additives, gas, corrosion inhibitors, scale inhibitors, catalysts, clay control agents, biocides, friction reducers, combinations thereof and the like. Further, while many diversion treatments may use an aqueous fluid as a base fluid, the present disclosure is not so limited and it is also envisioned that an oleaginous fluid alone or in combination with an aqueous fluid (as an emulsion) may also be used as the base fluid with the pre-processed fiber flocks of the present disclosure.

EXAMPLES

The following examples are presented to further illustrate the preparation and properties of the pre-processed fiber flocks of the present disclosure and should not be construed to limit the scope of the disclosure, unless otherwise expressly indicated in the appended claims.

Example 1

Figure 4:
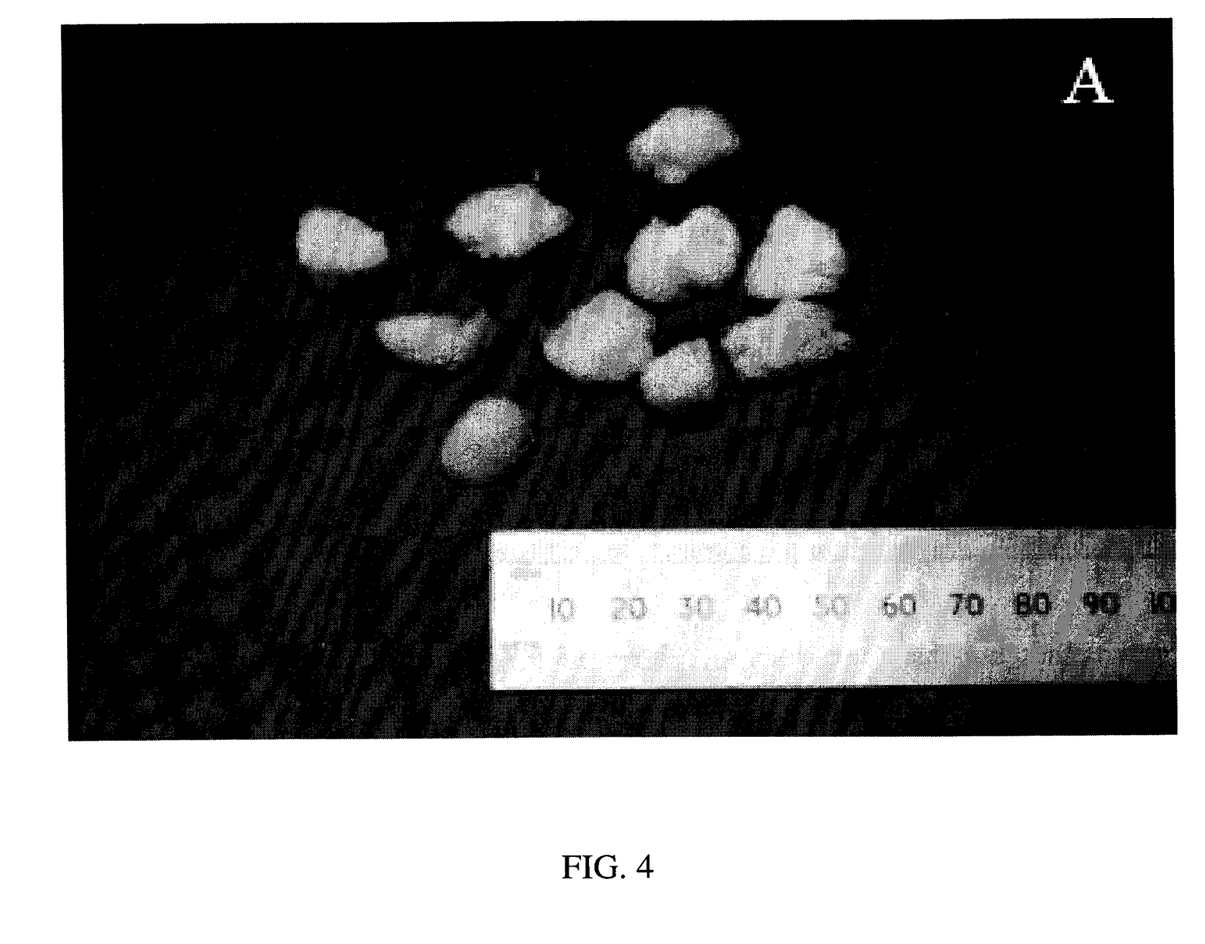
FIGS. 4 and 5 depict pre-processed fiber flocks according to embodiments of the present disclosure.
Figure 5:
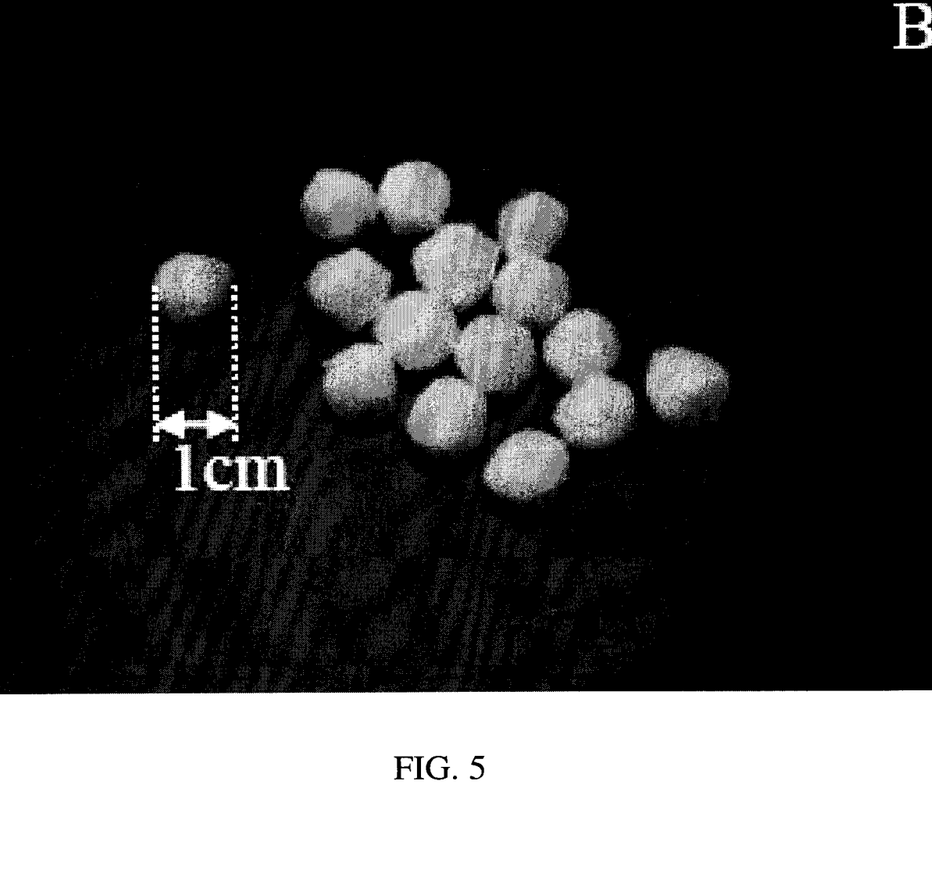

Fiber flocks with entrapped solids were prepared by heat-assisted gluing of syrline coated nylon fiber mixed with solid particles. The formed fiber network was afterwards cut into pieces. Specifically, an amount of 24 g of syrline coated nylon fiber (provided by 3M) was dispersed in 200 mL of deionized water using an overhead mixer. Then, 150 g of the blend of solid particles was introduced into the mixture and mixed for several minutes. The obtained slurry was placed into syringes having 1 cm in diameter and dehydrated. Then, the syringes were placed into an oven heated to 100° C. for several hours to make the syrline coating sticky which resulted in sticking fibers together at the points of fiber contacts. Afterwards, the samples were cooled down and fiber flocks were made by cutting and shaping the obtained fiber "rods" into pieces as shown in FIGS. 4 and 5. As seen in FIG. 5, pieces of pre-processed fiber flocks have a size of 1 cm. Table 1 below provides the composition of the blends of solid particles used for making pre-processed fiber flocks.

TABLE 1

Composition of solid blends used as filling compositions for pre-processed fiber flocks

| Blend N | Particles 1/content | Particles 2/content | Particles 3/content |
|---|---|---|---|
| 1 | PLA 800 microns (50%) | PLA 100 microns (50%) | |
| 2 | Sand 20/40 (50%) | Sand 70/140 (50%) | |
| 3 | Proppant 12/80 (34%) | Sand 20/40 (33%) | Sand 70/140 (33%) |

Example 2

Figure 6:
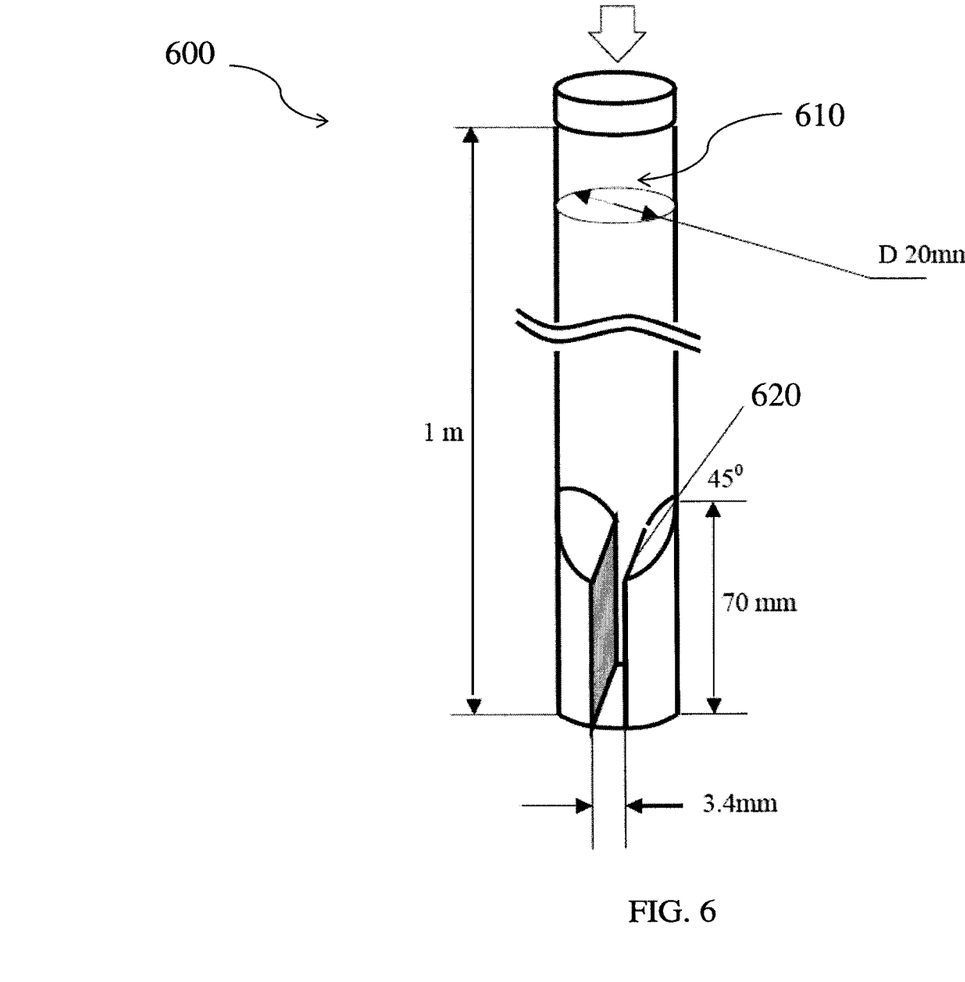
FIG. 6 shows a schematic view of the injection set-up used for creating pre-processed fiber flocks according to embodiments of the present disclosure.

A plug formed of pre-processed fiber flocks was prepared using 1 cm flocks which were bridged/jammed in a 6 mm slot. For plug creating, a laboratory set-up 600 as shown in FIG. 6 was used. The set-up 600 includes of an accumulator 610, a 6 mm slot (not shown), a pump (not shown) connected to the accumulator 610, and a 3.4 mm slot 620. Before the experiment, the accumulator 610 was filled with the slurry which comprised the following components: 250 ml of 0.5% guar gum solution (WF140), 27 g of fiber flocks having a size of 1 cm (as shown in FIG. 5) and comprising particles blend Ni (as shown in Table 1). WF140 is guar solution with a concentration of 40 lb guar gum to 1000 gallons of water, which corresponds to 4.8 g of guar per liter. The procedure for making such fiber flocks was described above in Example 1. Afterwards, the composition was displaced into the slot with water at a pumping rate of 1000 ml/min. After the experiment, the system was disassembled and plug formation was visually verified.

Example 3

This example demonstrates that the amount of diverting blends used for treatment diversion between several perforation clusters in slick water treatment may be as low as several liters when such diverting blends are designed for sealing seals in perforations or in near-wellbore zone in the close proximity to such perforations. For a fracturing stage comprising simultaneous slick-water fracture treatment of several clusters, the following parameters were taken: number of perforation clusters=6; diameter of perforation holes=0.33 in (0.84 cm); length of a perforation tunnel=⅓ ft (10 cm); length of a perforation cluster=1 ft (0.34 m); perforation density=6 shots/ft (18 shots/m).

Figure 7:
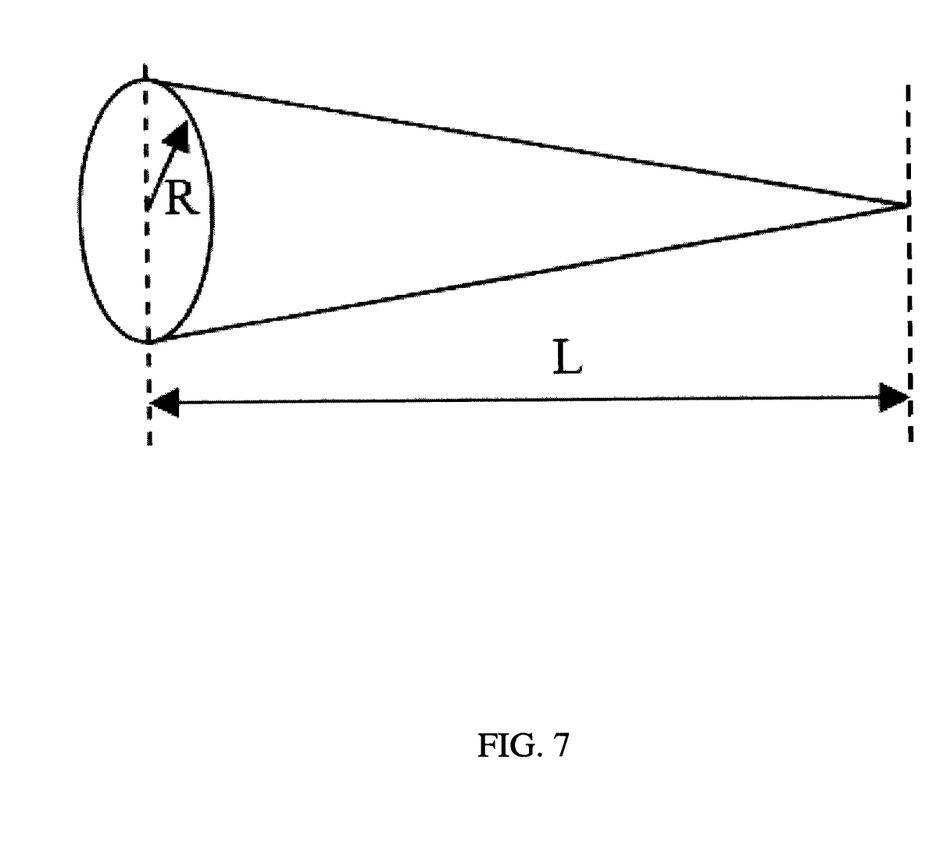
FIGS. 7 and 8 show illustrations of shapes of perforation tunnels according to embodiments to the present disclosure.

For the diversion between perforation clusters, it was assumed that isolation of ⅓ of the entire perforation tunnels is involved (6×6/3=12 perforations). The volume of each perforation is estimated as a volume of a cone having the diameter (2×R) of a perforation hole and the height equal to the length (L) of the perforation tunnel (as seen in FIG. 7). For given numbers, the volume of each perforation may be calculated using equation 1:

$$V = \frac{1}{3}\pi R^2 h \sim \frac{1}{3} \times 3.14 \times (0.42)^2 \times 10 \sim 2 \text{ cm}^3 \quad (1)$$

Figure 8:
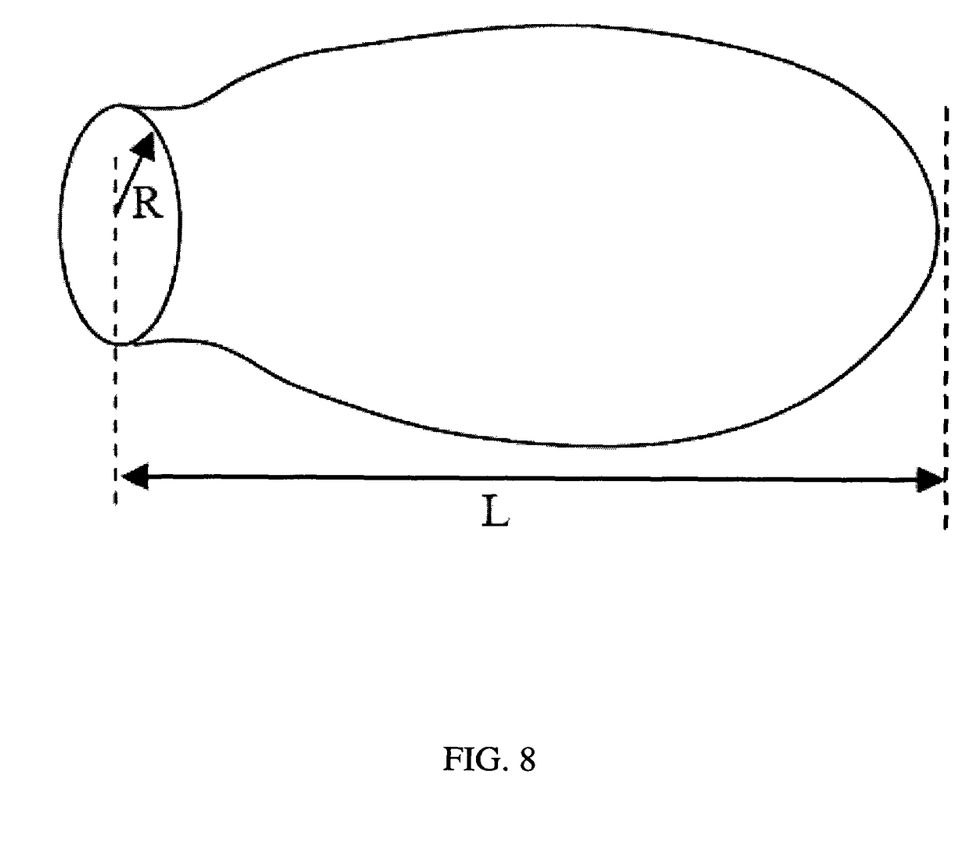

Assuming that the actual volume of the perforation tunnels during fracturing treatment may be higher by a factor of 100 (e.g., because of the surface erosion as seen in FIG. 8), the total volume of diverting material used for isolation of 12 perforations is given by equation 2:

$$12 \times 2 \times 100 \sim 2000 \text{ cm}^3 = 2L \quad (2)$$

which, for a typical range of densities (1-3 kg/L), corresponds to 1-6 kilograms of a diverting material.

Advantageously, embodiments of the present disclosure provide slurries and methods for treating a wellbore with such slurries that include a base fluid and a plurality of pre-processed fiber flocks dispersed in the base fluid. The pre-processed fiber flocks may be used as potential zonal isolation agents, fluid diverting agents, or as agents ("containers") for downhole delivery of various chemical additives. As the fibers are preformed in flocks, the formation of a network or a plug may occur without activation of the fibers. Another aspect of the present disclosure is that the pre-processed fiber flocks as described herein are characterized by high ability to bridge/jam in small slots and narrow voids giving plugs of low permeability. Furthermore, in comparison to diversion treatment techniques that include creating plugs of fiber material, the pre-processed fiber flocks of the present disclosure involve a lower amount of diverting material. Additionally, the following benefits exist: lower risk of wellbore plugging, lower risk of formation damage, and better clean up. Further removal of the diverting material is achieved either by self-degradation at downhole conditions, by introducing special chemical agents or by wellbore intervention.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of treating a subterranean formation penetrated by a wellbore, the method comprising:
   injecting a slurry into the wellbore, the slurry comprising a base fluid and a plurality of pre-processed fiber flocks dispersed in the base fluid, wherein the preprocessed fiber flocks are prepared and mixed into the slurry prior to injection of the slurry by:
   applying an adhesive material to fiber particles to generate adhesive-coated fiber particles;
   dispersing the adhesive-coated fiber particles into water to generate a mixture;
   mixing one or more solid additives into the mixture;
   dehydrating the adhesive-coated fiber particles after mixing the one or more solid additives into the mixture; and
   heating the adhesive-coated fiber particles after the dehydrating of the adhesive-coated fiber particles such that the dehydrated adhesive-coated fiber particles adhere together at points of fiber contact, thereby forming a 3D fiber network;
   allowing the pre-processed fiber flocks to form a removable plug in the subterranean formation, wherein the adhesive-coated fiber particles are configured to remain adhered together as the 3D fiber network to form the removable plug; and
   performing a downhole operation.

2. The method of claim 1, wherein the downhole operation comprises stimulating the subterranean formation.

3. The method of claim 1, wherein the downhole operation is drilling the wellbore.

4. The method of claim 1, wherein the pre-processed fiber flocks comprise degradable components.

5. The method of claim 4, wherein the one or more solid additives are entrapped within the 3D fiber network.

6. The method of claim 5, the method further comprising releasing the one or more solid additives by a mechanical action comprising squeezing by pressure.

7. The method of claim 1, wherein a size of the 3D fiber networks is larger than an average width of a void within the subterranean formation that is intended to be closed or isolated.

8. The method of claim 1, wherein the one or more solid additives comprise at least one of ceramic materials, sand, polymer particles, or blends thereof.

9. The method of claim 8, wherein the polymer particles are polylactic acid particles.

10. The method of claim 1, wherein the pre-processed fiber flocks further comprise a removable coating comprising a meltable material at downhole conditions.

11. The method of claim 1, wherein the adhesive-coated fiber particles are heated to 100° C.

12. The method of claim 1, wherein the adhesive-coated fiber particles are heated in an oven after the dehydrating of the adhesive-coated fiber particles.

13. The method of claim 1, wherein the one or more solid additives include an additive blend including at least one of polylactic acid, sand, and proppant.

* * * * *